United States Patent
Shiozawa (10) Patent No.: US 12,135,972 B2
(45) Date of Patent: Nov. 5, 2024

(54) IN-VEHICLE INFORMATION PROCESSING APPARATUS, CONTROL METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takayuki Shiozawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 106 days.

(21) Appl. No.: 17/906,758

(22) PCT Filed: Mar. 12, 2021

(86) PCT No.: PCT/JP2021/010070
§ 371 (c)(1),
(2) Date: Sep. 20, 2022

(87) PCT Pub. No.: WO2021/193145
PCT Pub. Date: Sep. 30, 2021

(65) Prior Publication Data
US 2023/0214227 A1   Jul. 6, 2023

(30) Foreign Application Priority Data
Mar. 23, 2020   (JP) .................... 2020-051504

(51) Int. Cl.
*G06F 9/44*   (2018.01)
*G06F 9/4401*   (2018.01)

(52) U.S. Cl.
CPC ................... *G06F 9/4406* (2013.01)

(58) Field of Classification Search
None
See application file for complete search history.

(56) References Cited

U.S. PATENT DOCUMENTS

2005/0091354 A1*  4/2005  Lowell ............... G06F 11/3051
                                                       709/224
2015/0278046 A1   10/2015  Zellermayer et al.

FOREIGN PATENT DOCUMENTS

JP   2000-222376 A   8/2000
JP   2006-31203 A    2/2006
(Continued)

OTHER PUBLICATIONS

Akio Idehara et al., A proposal of S/W architecture based on functional separation for embedded processors, IPSJ Symposium Series: Embedded Systems Symposium 2013.
(Continued)

*Primary Examiner* — Stefan Stoynov
(74) *Attorney, Agent, or Firm* — Honigman LLP (57) ABSTRACT

Provided is an in-vehicle information processing apparatus capable of continuously executing an application program run on an OS even while that OS is restarting, a control method, and a computer program. An in-vehicle information processing apparatus according to the present embodiment is installed in a vehicle and includes a control unit that controls a plurality of operating systems (OSs) running on common hardware, wherein the control unit determines whether or not the plurality of OSs need to be restarted, in a case in which the control unit determines that one OS needs to be restarted, runs an application program running on the one OS on another OS different from the one OS, restarts the one
(Continued)

LEGEND
A= Application 1
B= Application 2
C= Application 3
D= Application 4

OS, and after restart is complete, runs the application program running on the other OS on the one OS.

11 Claims, 9 Drawing Sheets

(56) References Cited

FOREIGN PATENT DOCUMENTS

JP  2012-3510 A   1/2012
WO  2013-132646 A1  9/2013

OTHER PUBLICATIONS

International Search Report, Application No. PCT/JP2021/010070, mailed May 18, 2021. ISA/Japan Patent Office.

* cited by examiner

LEGEND
A= Application 1
B= Application 2
C= Application 3
D= Application 4

FIG. 4

Application table

| OS ID | Application information ||| | Required function information ||||||
|---|---|---|---|---|---|---|---|---|---|---|
| | Application ID | Data amount | Can/cannot be stopped | OS Kernel | Driver A | Driver B | Driver C | Library A | Library B | Data amount |
| OS 1 | Application 1 | 5 MB | Cannot | OS 1 / OS 2 | Required | Not required | Required | Not required | Required | 3 0 M B |
| OS 1 | Application 2 | 3 MB | Cannot | OS 1 | Not required | Required | Not required | Required | Required | 2 0 M B |
| OS 1 | Application 3 | 1 0 M B | Can | OS 1 | Required | Required | Required | Required | Required | 5 0 M B |
| OS 2 | Application 4 | 5 MB | Can | OS 1 / OS 2 | Required | Not required | Required | Not required | Required | 3 0 M B |

FIG. 5

LEGEND
A= Application 1
B= Application 2
C= Application 3
D= Application 4

Application table

| OS ID | Application information ||| Required function information ||||||
|---|---|---|---|---|---|---|---|---|---|
| | Application ID | Data amount | Priority | OS Kernel | Driver A | Driver B | Driver C | Library A | Library B | Data amount |
| OS 1 | Application 1 | 5 MB | 1 | OS 1 / OS 2 | Required | Not required | Required | Not required | Required | 30 MB |
| OS 1 | Application 2 | 3 MB | 1 | OS 1 | Not required | Required | Not required | Required | Required | 20 MB |
| OS 1 | Application 3 | 10 MB | 3 | OS 1 | Required | Required | Required | Required | Required | 50 MB |
| OS 2 | Application 4 | 5 MB | 2 | OS 1 / OS 2 | Required | Not required | Required | Not required | Required | 30 MB |

IN-VEHICLE INFORMATION PROCESSING APPARATUS, CONTROL METHOD, AND COMPUTER PROGRAM

CROSS-REFERENCE TO RELATED APPLICATIONS

This application is the U.S. national stage of PCT/JP2021/010070 filed on Mar. 12, 2021, which claims priority of Japanese Patent Application No. JP 2020-051504 filed on Mar. 23, 2020, the contents of which are incorporated herein.

TECHNICAL FIELD

The present disclosure relates to an in-vehicle information processing apparatus that controls a plurality of operating systems (OS) running on common hardware, a control method, and a computer program.

BACKGROUND

The functionality of information processing apparatuses installed in vehicles has been increasing, enabling various application programs to be executed. Also, in some cases, an in-vehicle information processing apparatus can run in parallel a plurality of OS and can run in parallel a plurality of application programs running on different OSs. With an in-vehicle information processing apparatus, in a case in which OS update processing is executed or there is an OS abnormality stoppage, for example, the OS needs to be restarted, meaning that the application programs running on the OS cannot be run while the OS is restarting.

In WO 2013/132646, an information processing apparatus is described which, when, in a virtual environment, a first OS and a second OS are running and a first application for displaying an image on a display means is running on the first OS, in a case in which a need for the first OS to restart is detected, a second application for displaying a restart image on the display means is run on the second OS at least until the restart of the first OS has completed.

CITATION LIST

Patent Documents

Patent Document 1: WO 2013/132646

SUMMARY OF INVENTION

Technical Problem

With the information processing apparatus described in WO 2013/132646, because the second application running on the second OS needs to be prepared in addition to the first application for displaying running on the first OS, a storage area such as memory may be wastefully used. Also, in WO 2013/132646, the second application is a simpler version of the first application and can only execute limited processing while the first OS is restarting.

In light of the problem described above, the present disclosure is directed at providing an in-vehicle information processing apparatus that is expected to continuously execute an application program run on an OS even while that OS is restarting, a control method, and a computer program.

SUMMARY

An in-vehicle information processing apparatus according to the present aspect is installed in a vehicle and includes a control unit that controls a plurality of OSs running on common hardware, wherein the control unit determines whether or not the plurality of OSs need to be restarted, in a case in which the control unit determines that one OS needs to be restarted, runs an application program running on the one OS on another OS different from the one OS, restarts the one OS, and after restart is complete, runs the application program running on the other OS on the one OS.

The present application can be realized not only as an apparatus with the advantageous control unit described above, but also as a method including such advantageous processing steps and a computer program for causing a computer to execute these steps. Also, a portion or all of these apparatuses can be realized as a semiconductor integrated circuit or as other apparatuses or a system that includes these apparatuses.

Advantageous Effects

According to the foregoing, an application program running on an OS is expected to be continuously executed while the OS is restarting.

DETAILED DESCRIPTION OF PREFERRED EMBODIMENTS

Firstly, embodiments of the present disclosure will be listed and described. One or more parts of the embodiments described below may be combined in a discretionary manner.

First Aspect

An in-vehicle information processing apparatus according to a first aspect is installed in a vehicle and includes a control unit that controls a plurality of OSs running on common hardware, wherein the control unit determines whether or not the plurality of OSs need to be restarted, in a case in which the control unit determines that one OS needs to be restarted, runs an application program running on the one OS on another OS different from the one OS, restarts the one OS, and after restart is complete, runs the application program running on the other OS on the one OS.

According to the first aspect, the in-vehicle information processing apparatus is provided with the control unit that controls the plurality of OSs that run on common hardware. The control unit of the in-vehicle information processing apparatus determines whether or not the plurality of OSs need to be restarted and, in a case in which one of the OSs needs to be restarted, runs the application program running on the one OS on another OS. Thereafter, the control unit restarts the one OS and, when restart is complete, runs the application program that was run on the other OS on the one OS. In this manner, the in-vehicle information processing apparatus is capable of executing the same program as the application program running on one OS on another OS and expected to continuously execute the processing of the application program even while the one OS is restarting.

Second Aspect

In a second aspect, preferably, the control unit runs the other OS in parallel while the one OS is being restarted.

According to the second aspect, the in-vehicle information processing apparatus runs the other OS in parallel while the one OS is being restarted. In this manner, the in-vehicle information processing apparatus is capable of executing in parallel the application program on the other OS while the one OS is restarting.

Third Aspect

In a third aspect, a storage unit that temporarily stores an OS and application program to be run is preferably further provided, wherein the control unit, in a case in which an application program running on the one OS is run on the other OS, copies the application program stored in one storage area of the storage unit used by the one OS to another storage area of the storage unit used by the other OS, and after restart of the one OS is complete, deletes the application program copied to the other storage area.

According to the third aspect, the in-vehicle information processing apparatus, in a case in which the application program that runs on the one OS is run on the other OS, copies the application program stored in the storage area used by the one OS to the storage area used by the other OS. After the one OS has completed restarting, the copied application program is deleted from the storage area of the other OS by the in-vehicle information processing apparatus. In this manner, the in-vehicle information processing apparatus is capable of copying the application program from the storage area of the one OS and run the application program on the other OS. Thus, an application program that can run on the other OS does not need to be prepared.

Fourth Aspect

In a fourth aspect, preferably, the control unit, in a case in which the control unit determines that the one OS needs to be restarted, determines, from among one or more application programs running on the one OS, an application program that should be continuously run while the one OS is restarted, determines whether or not there is another OS capable of running an application program determined that it should continuously run, determines whether or not there is free capacity to store the application program in another storage area used by another OS determined to be able to run the application program, and in a case in which the control unit determines that there is free capacity, copies the application program to the other storage area.

According to the fourth aspect, the in-vehicle information processing apparatus determines, from one or more application programs running on the one OS determined to need to be restarted, which application program should be continuously run while the one OS is restarted. The in-vehicle information processing apparatus determines whether or not the other OS is capable of running the application program that should be continuously run. The in-vehicle information processing apparatus determines whether or not there is enough free capacity to store the application program in the storage area of the other OS determined to be capable of running the application program. In a case in which it is determined that there is enough free capacity, the in-vehicle information processing apparatus copies the application program to the storage area of the other OS and runs the application program. According to this processing, the in-vehicle information processing apparatus is able to more reliably run the application program that should be continuously run while the OS is restarting.

Fifth Aspect

In a fifth aspect, preferably, in a case in which the control unit determines that the free capacity does not exist, the control unit puts restarting the one OS on standby.

According to the fifth aspect, in a case in which there is not enough free capacity to store the application program in the storage area of the other OS, the in-vehicle information processing apparatus puts the restart of the one OS running the application program on standby without restarting the one OS. This prevents an application program that should be continuously run from being stopped from running.

Sixth Aspect

In a sixth aspect, preferably, after an ignition switch of the vehicle is switched from an on state to an off state, the control unit restarts the one OS on standby.

According to the sixth aspect, in a case in which the OS restart is put on standby, the in-vehicle information processing apparatus executes the OS restart after the ignition switch of the vehicle is switched from the on state to the off state. In this manner, the in-vehicle information processing apparatus can restart the OS at a stage where there is a high likelihood that the user has finished using the vehicle, in other words, at a stage where there is a high likelihood that no problems will occur if the processing of the application program is stopped.

Seventh Aspect

In a seventh aspect, preferably, the control unit, in a case in which the control unit determines that the other OS does not exist, starts up an alternative OS that functions as an alternative to the one OS, and runs the application program on the alternative OS.

According to the seventh aspect, in a case in which it is determined that there is no other OS capable of running the application program that should be continuously run, the in-vehicle information processing apparatus according to the present embodiment starts up an alternative OS that functions as an alternative to the OS to be restarted and runs the application program on the alternative OS. Accordingly, the in-vehicle information processing apparatus is able to more reliably run the application program that should be continuously run.

Eighth Aspect

In an eighth aspect, preferably, the alternative OS is an OS including a portion of a plurality of functions the one OS is provided with.

According to the eighth aspect, the in-vehicle information processing apparatus uses an OS including a portion of the functions of the OS to be restarted as the alternative OS. In this manner, compared to the case of an alternative OS with all of the functions of the OS, the use amount of the storage area of the in-vehicle information processing apparatus can be reduced.

Ninth Aspect

In a ninth aspect, preferably, each application program is set with a priority; and the control unit determines an application program that should be continuously run while the one OS is restarted according to the priority.

According to the ninth aspect, the in-vehicle information processing apparatus determines which application program should be continuously run while the OS is restarted according to the priority set to the application program. In this manner, the in-vehicle information processing apparatus is capable of prioritizing the running of application programs with a high priority on another OS, for example.

Tenth Aspect

In a tenth aspect, preferably, the control unit runs the plurality of OSs in a virtual environment obtained by virtualizing the hardware.

According to the tenth aspect, the in-vehicle information processing apparatus can provide a virtual environment obtained by virtualizing the hardware to the OS and run a plurality of OSs on the virtual environment. Accordingly, the versatility of the OSs run by the in-vehicle information processing apparatus can be improved and development can be simplified.

Eleventh Aspect

A control method according to an eleventh aspect for an in-vehicle information processing apparatus installed in a vehicle that controls a plurality of OSs running on common hardware includes, via a control unit of the in-vehicle information processing apparatus, determining whether or not the plurality of OSs need to be restarted, in a case in which the control unit determines that one OS needs to be restarted, running an application program running on the one OS on another OS different from the one OS, restarting the one OS, and after restart is complete, running the application program running on the other OS on the one OS.

According to the eleventh aspect, as with the first aspect, the processing of the application program is expected to be continuously executed while the OS is restarting.

Twelfth Aspect

A computer program according to a twelfth aspect for causing a computer installed in a vehicle to executing processing to controls a plurality of OSs running on common hardware executes processing including, via the computer, determining whether or not the plurality of OSs need to be restarted, in a case in which the control unit determines that one OS needs to be restarted, running an application program running on the one OS on another OS different from the one OS, restarting the one OS, and after restart is complete, running the application program running on the other OS on the one OS.

According to the twelfth aspect, as with the first aspect, the processing of the application program is expected to be continuously executed while the OS is restarting.

A specific example of an in-vehicle information processing system according to an embodiment of the present disclosure will be described with reference to the drawings. The present disclosure is not limited to these examples. The present disclosure is defined by the scope of the claims, and intended to include all modifications that are equivalent to or within the scope of the claims.

System Configuration

Figure 1:
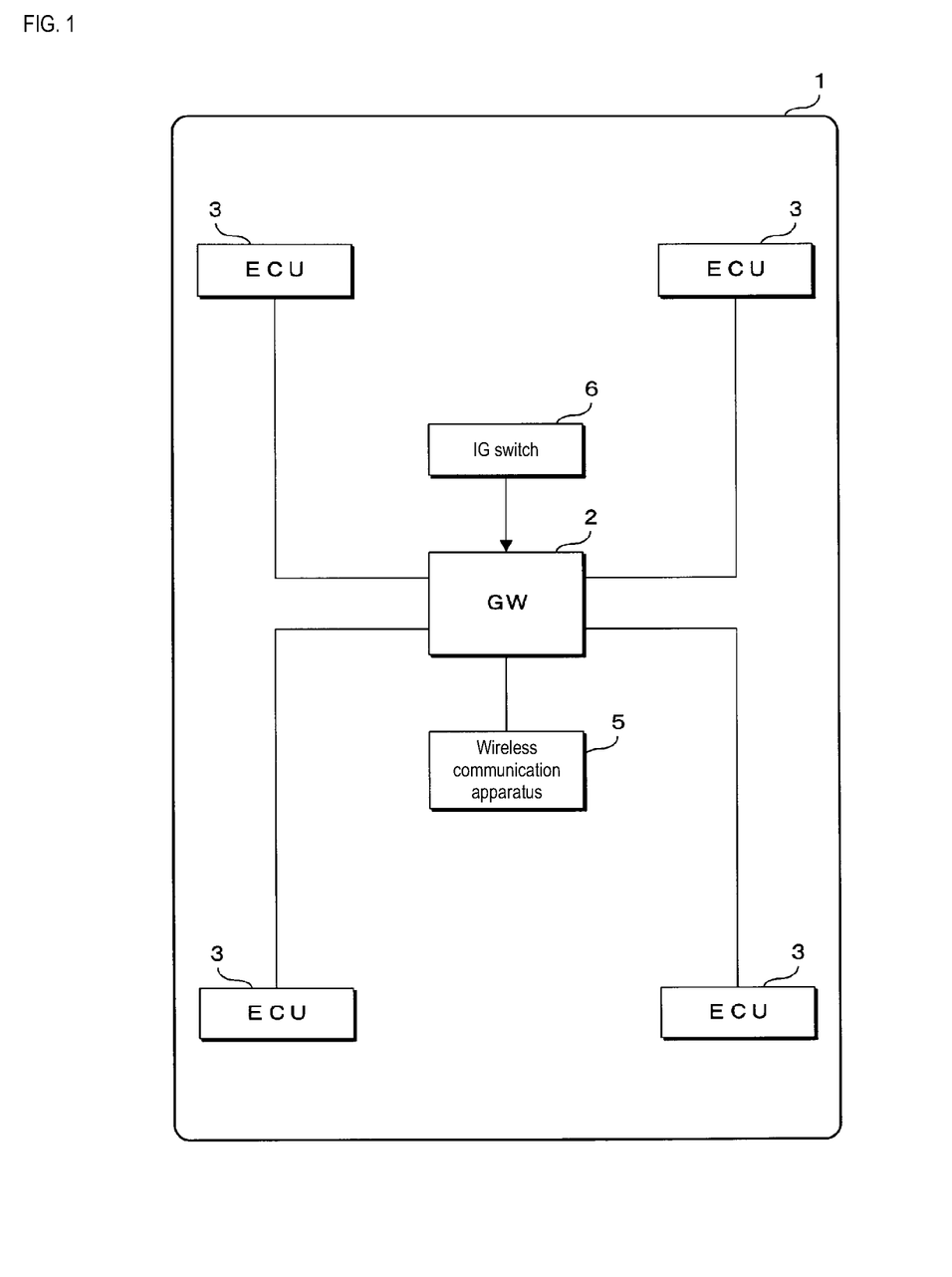
FIG. 1 is a schematic diagram illustrating an example configuration of an in-vehicle information processing system according to a present embodiment.

FIG. 1 is a schematic diagram illustrating an example configuration of an in-vehicle information processing system according to the present embodiment. The in-vehicle information processing system according to the present embodiment is a system in which a gateway (GW) 2 installed in a vehicle 1 and a plurality of ECUs 3 communicate via a plurality of communication lines and various information processing relating to driving control of the vehicle 1 and the like is executed via cooperation of these in-vehicle apparatuses. In the illustrated example, four ECUs 3 are connected to the GW 2 by separate communication lines. The GW 2 is capable of executing processing to relay messages being transmitted and received between communication lines and of transmitting and receiving messages between the four ECUs 3 via the communication lines and the GW 2.

Also, the in-vehicle information processing system is provided with a wireless communication apparatus 5 that wirelessly communicates with devices external to the vehicle 1. The wireless communication apparatus 5 performs wireless communication via a mobile phone communication network or a wireless (local area network) LAN, for example, enabling messages to be transmitted and received to/from a server device, a smart phone held by a user, or a similar device located outside the vehicle 1. The wireless communication apparatus 5 is connected to the GW 2 via a communication line. The GW 2 is capable of transmitting and receiving messages to/from a server device or similar device located outside the vehicle 1 via the wireless communication apparatus 5. Also, the GW 2 relays communication between the ECUs 3 and the wireless communication apparatus 5, enabling the ECUs 3 to transmit and receive messages to/from a server device or similar device located outside the vehicle 1 via the GW 2 and the wireless communication apparatus 5.

An IG signal from an ignition (TO) switch 6 provided in the vehicle 1 is input to the GW 2. The GW 2 is capable of determining the state of the vehicle 1, i.e., whether or not the vehicle 1 is in a state where there is a possibility the vehicle 1 will travel, on the basis of the input IG signal. Note that the determination of the state of the vehicle 1 may be performed not on the basis of the IG signal from the IG switch 6, but on the basis of various information, such as the speed of the vehicle 1, the acceleration, the rotational speed of the engine, the state of the shift lever, the state of the accelerator, and the like. The information required to determine the state of the vehicle 1 is input directly to the GW 2 or indirectly to the GW 2 via communication.

The GW 2 executes and runs a plurality of application programs in order to execute various processing, such as message relay processing, vehicle 1 control processing, and the like. To execute an application program, an OS is required for managing program execution, managing hardware resources, and the like. The GW 2 according to the present embodiment is capable of running a plurality of OSs, enabling a plurality of application programs developed for different OSs to be run on a single apparatus. Also, the GW 2 runs the plurality of OSs in parallel and executes and runs the plurality of application programs on these OSs. For example, by the GW 2 switching between and executing the plurality of OSs and the plurality of application programs on the basis on time division, the GW 2 is capable of running the plurality of OSs and the plurality of application programs essentially simultaneously and in parallel. Also, for example, in a case in which the GW 2 is provided with a plurality of arithmetic processing devices, such as a central processing unit (CPU), micro-processing unit (MPU), and the like, the plurality of OSs and the plurality of application programs may be actually run in parallel using the plurality of arithmetic processing devices.

Software, such as application programs, OSs, and the like, is updated (update processing) to fix bugs, add new functions, and the like. GW 2 acquires update software by communicating with a predetermined server apparatus via the wireless communication apparatus 5 and performs an update by rewriting the software stored in a secondary storage apparatus, such as a flash memory, a hard disk, or the like. For example, in the case of an OS update, after the software rewrite has been completed, the GW 2 needs to restart the OS. Note that the cause of the OS restart may include not only the update described above but various other causes such as the occurrence of a bug, for example.

In the related art, in a case in which the OS is restarted, one or more application programs running on the OS are unable to run until the restart is complete. The GW 2 according to the present embodiment is capable of continuously running the application programs that should continue running during an OS restart without stopping them due to the OS restart. Note that in the present embodiment, the GW 2 is used as an example, but the similar technology is applicable to the ECU 3 or various other in-vehicle information processing apparatuses.

Figure 2:
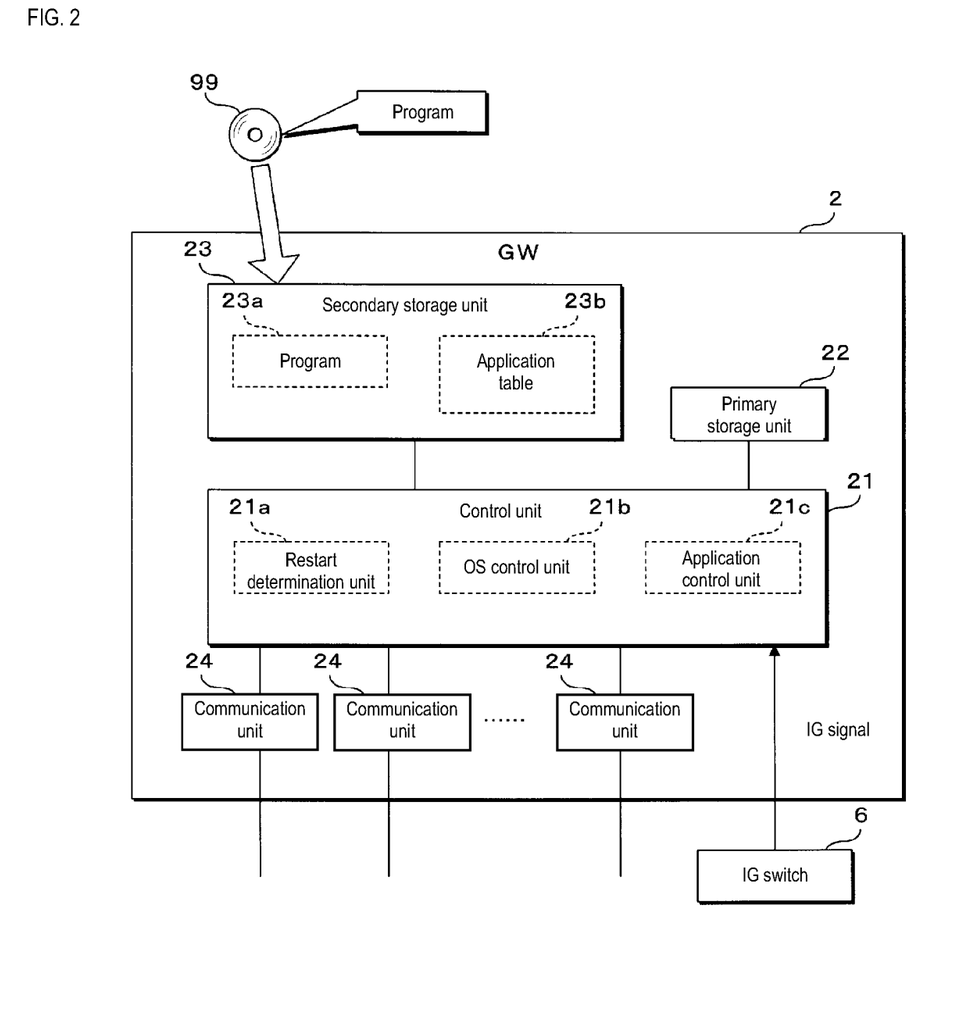
FIG. 2 is a block diagram illustrating the configuration of a GW according to the present embodiment.

FIG. 2 is a block diagram illustrating the configuration of the GW 2 according to the present embodiment. The GW 2 according to the present embodiment is provided with a control unit (processor) 21, a primary storage unit (storage) 22, a secondary storage unit (storage) 23, a plurality of communication units (transceivers) 24, and the like. The control unit 21 is configured using an arithmetic processing device, such as a CPU, an MPU, or the like. The control unit 21 is capable of executing various types of processing by reading out onto the primary storage unit 22 and executing a program stored in the secondary storage unit 23.

The primary storage unit 22 is configured, for example, using a memory device, such as a Static Random Access Memory (SRAM), a Dynamic Random Access Memory (DRAM), or the like. The primary storage unit 22 is a storage unit with less storage capacity than the secondary storage unit 23, but the control unit 21 is able to read and write data to the primary storage unit 22 faster than to the secondary storage unit 23. In the present embodiment, the primary storage unit 22 is a volatile storage unit, but in other embodiments may be non-volatile.

The secondary storage unit 23 is configured, for example, using a non-volatile memory device, such as a flash memory, Electrically Erasable Programmable Read Only Memory (EEPROM), or the like or a magnetic storage apparatus such as a hard disk. The secondary storage unit 23 stores various programs executed by the control unit 21 and various data required in the processing by the control unit 21. The secondary storage unit 23 of the present embodiment stores a program 23a executed by the control unit 21 and an application table 23b including information relating to the application program.

The GW 2 according to the present embodiment implements a hierarchically structured storage means, i.e., a memory hierarchy, using two storage units, the primary storage unit 22 and the secondary storage unit 23. In a case in which the control unit 21 of the GW 2 executes the program 23a, the program 23a stored in the secondary storage unit 23 is read out to the primary storage unit 22, and the program 23a stored in the primary storage unit 22 is read out and executed by the control unit 21. The control unit 21 in the present embodiment, by executing the program 23a, executes various types of processing, such as managing the application program via the OS, controlling the vehicle 1 via the application program, managing the OS and the application program, and the like.

Note that the program 23a as illustrated in FIG. 2 may include various programs, such as an OS program and an application program, and may also include a program for managing the running of the OS and the application program. The program 23a may be written to the secondary storage unit 23 at the manufacturing stage of the GW 2, for example. Also, for example, the program 23a may be distributed by a remote server apparatus or the like, of the GW 2 may acquire the program 23a by communicating with a server apparatus and writing the program 23a to the secondary storage unit 23. The program 23a stored on a recording medium 99, such as a memory card, optical disk, or the like, may also be read out by the GW 2 and stored on the secondary storage unit 23, for example. Also, for example, the program 23a stored on the recording medium 99 may be read out by a writing apparatus and written to the secondary storage unit 23 of the GW 2. The program 23a may be provided in the form of being distributed via a network, or may be provided in the form of being stored on the recording medium 99. The OS, application program, and various similar programs included in the program 23a may be collectively distributed or may be distributed via different methods.

The application table 23b of the secondary storage unit 23 is a table storing information relating to the application program executed by the GW 2. The GW 2 is capable of determining which application programs should be continuously run during an OS restart and the like on the basis of the information stored in the application table 23b. The configuration of the application table 23b will be described below in detail. The application table 23b is created in advance by the developer or the like of the present system and is stored in the secondary storage unit 23. The application table 23b may be distributed together with the program 23a or may be distributed separate from the program 23a. In a case in which an OS or an application program included in the program 23a is updated, the contents of the application table 23b may be updated.

The plurality of communication units 24 are each connected with a communication line and transmit and receive messages with in-vehicle apparatuses, such as the ECUs 3 or the wireless communication apparatus 5, via communication lines. In the present embodiment, the communication units 24 transmit and receive messages following a communication protocol such as Ethernet (registered trademark), for example. The communication units 24 may be configured using an integrated circuit (IC) of an Ethernet physical layer (PHY), for example. However, the communication protocol used by the communication units 24 is not limited to Ethernet, and, for example, a Controller Area Network (CAN), FlexRay, or a similar communication protocol can be employed. The communication units 24 transmit messages by outputting the data received from the control unit 21 to the communication lines as electrical signals. The communication units 24 sample and obtain the potential of the communication lines to convert the electric signals on the communication lines to digital data, which is then sent to the control unit 21 as a received message.

Also, in the GW 2 according to the present embodiment, a restart determination unit 21a, an OS control unit 21b, and an application control unit 21c are implemented in the control unit 21 as software functional blocks by the program 23a stored in the secondary storage unit 23 being read out and executed by the control unit 21. The restart determination unit 21a executes processing to determine whether or not the currently running OS needs to be restarted. The restart determination unit 21a executes OS update processing, for example, and, in a case in which the processing is complete, can determine that the updated OS needs to be restarted. Note that the cause for restarting is not limited to an update.

The OS control unit 21b executes processing to manage the OS executed by the GW 2. The OS control unit 21b performs control including starting up, stopping, restarting, and updating the OS, for example. Also, in the present embodiment, when an OS is restarted, the OS control unit 21b executes processing to generate an alternative OS and start up the alternative OS.

The application control unit 21c executes processing to manage the application program executed by the GW 2. In the present embodiment, the application control unit 21c determines an application program that should not be stopped running and should continue running during an OS restart from among the application programs running on an OS being restarted, on the basis of the application table 23b of the secondary storage unit 23. The application control unit 21c executes the application program that should continue running on a different OS to the OS being restart and executes the application program and the original OS after the restart is complete.

Application Program Control Processing

Figure 3:
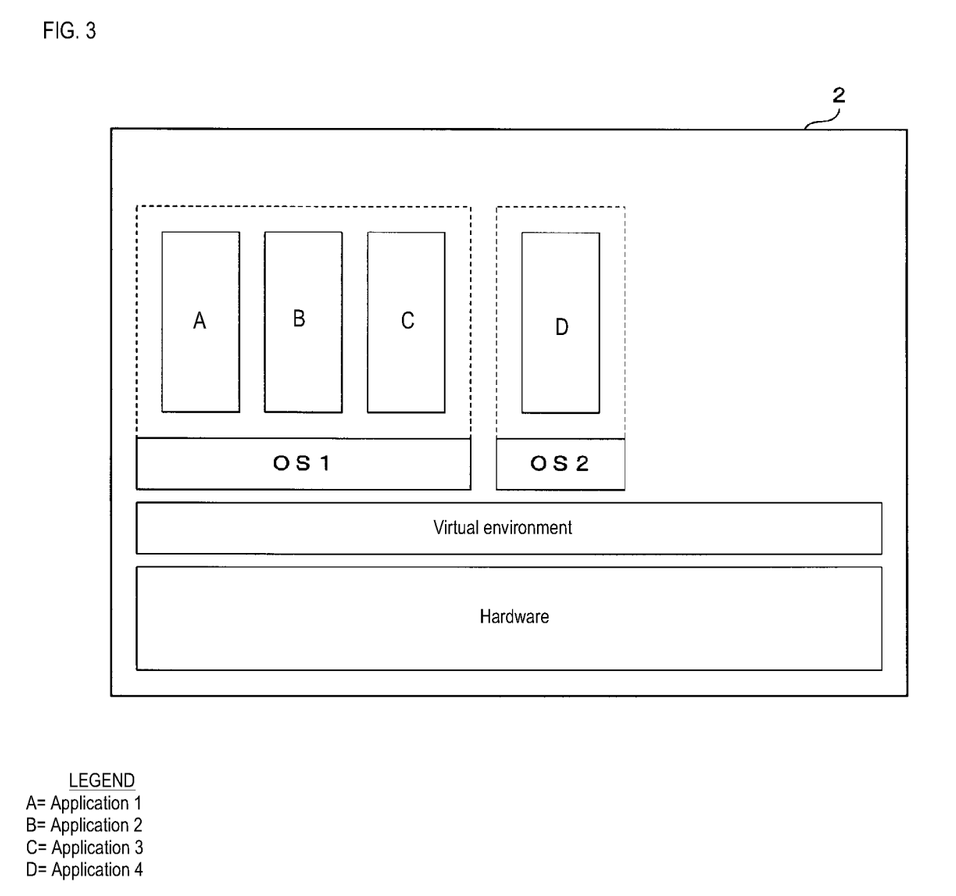
FIG. 3 is a schematic diagram for describing the software configuration of the GW according to the present embodiment.

FIG. 3 is a schematic diagram for describing the software configuration of the GW 2 according to the present embodiment. The GW 2 according to the present embodiment has the software configuration illustrated in FIG. 3 implemented by the control unit 21 reading out the program 23a stored in the secondary storage unit 23 onto the primary storage unit 22 and executing the program 23a. The hardware illustrated in FIG. 3 are resources relating to the hardware including the control unit 21, the primary storage unit 22, and the like, and the GW 2 according to the present embodiment provides the hardware virtualized into a virtual environment to the OS. In the virtual environment, irrespective of the actual hardware configuration and the like, an interface based on a predetermined virtual hardware configuration is provided to the OS. The hardware is controlled by the virtual environment converting commands and the like from the OS into commands suitable for the actual hardware. By having a virtual environment between the OS and the hardware, the same OS and application program can be executed on another GW 2 with a different hardware configuration. The program for implementing the virtual environment may be created for each hardware configuration.

In the GW 2 according to the present embodiment, in a normal running state, for example, two OSs, OS 1 and OS 2, are running on the virtual environment. Also, for example, three application programs, applications 1 to 3, are running on the OS 1, and one application program, application 4, is running on the OS 2. Note that in the present embodiment, the OS with the OS identification information of OS 1 is simply referred to as OS 1, and the OS with the OS identification information of OS 2 is simply referred to as OS 2. In a similar manner, the application program with the application program identification information of application 1 is simply referred to as application 1, the application program with the application program identification information of application 2 is simply referred to as application 2, and the application program with the application program identification information of application 3 is simply referred to as application 3.

For example, in a case in which the control unit 21 of the GW 2 is an arithmetic processing device with a single processor or a single core, the applications 1 to 4 are switched using time sharing and run in parallel. Also, for example, in a case in which the control unit 21 of the GW 2 is an arithmetic processing device with a multi-processor or a multi-core, the applications 1 to 4 are simultaneously run in parallel. Because any difference in the hardware configuration can be accommodated in a virtual environment, the OS 1, the OS 2, and the applications 1 to 4 run irrespective of the actual hardware configuration.

The two OSs, OS 1 and OS 2, run by the GW 2 according to the present embodiment may be different types of OSs, such as Linux (registered trademark), Windows (registered trademark), and the like, or may be different versions of the same type of OS. The applications 1 to 4 may be dedicated application programs for the corresponding OS, or may be general application programs that run on a plurality of OSs, for example.

The GW 2 according to the present embodiment reads out the OS and the application program stored in the secondary storage unit 23 as the program 23a and stores them in the primary storage unit 22, and then the OS and the application program stored in the primary storage unit 22 is read out and executed by the control unit 21. When the OS is read out from the secondary storage unit 23 onto the primary storage unit 22 and executed, for each OS, the GW 2 allocates a storage area of a predetermined size in the primary storage unit 22. In FIG. 3, the storage areas allocated for the OSs are indicated by rectangles with a dashed line. The OSs execute processing using the allocated storage area and cannot access the storage area allocated to other OSs.

Also, in a case in which the application program stored in the secondary storage unit 23 is read out onto the primary storage unit 22, the GW 2 stores the read application program onto the storage area allocated to the OS managing the application program. In the example illustrated in FIG. 3, the applications 1 to 3 are stored in the storage area of the OS 1, and the application 4 is stored in the storage area of the OS 2.

Figure 4:
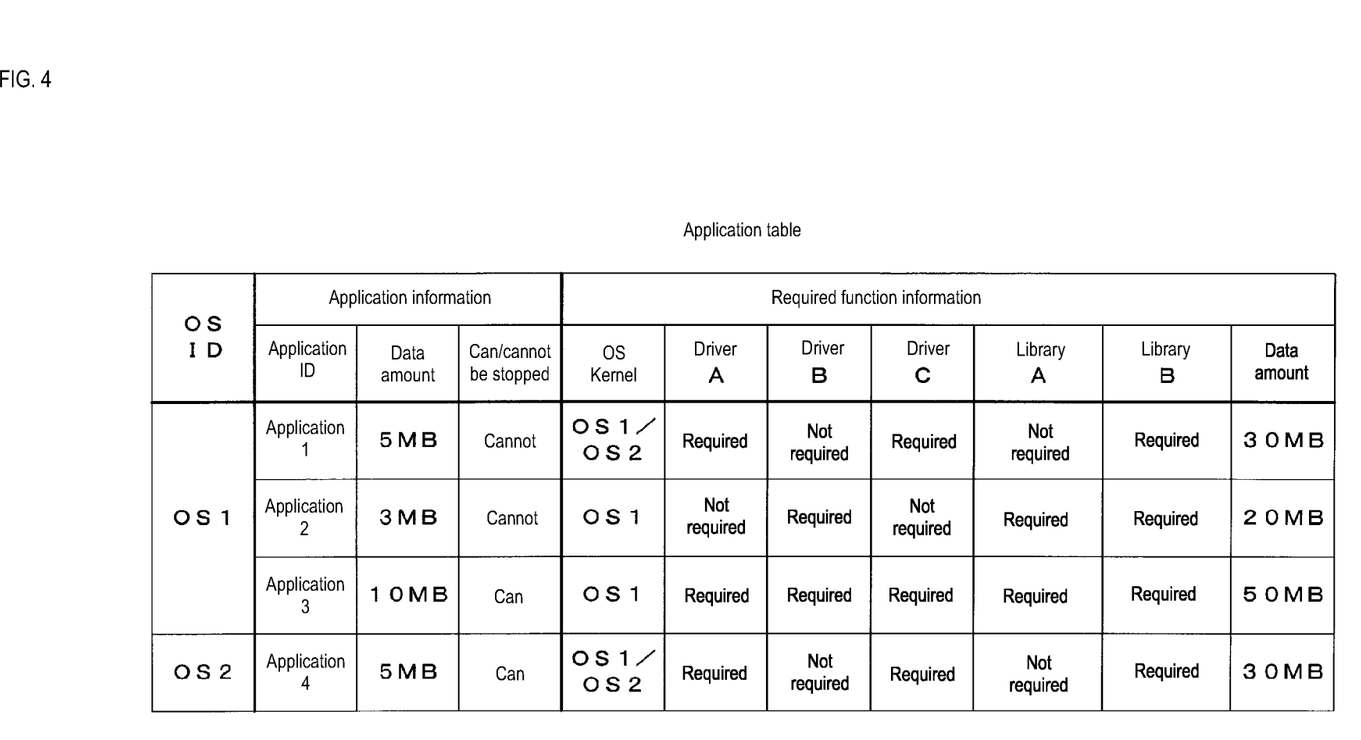
FIG. 4 is a schematic diagram illustrating an example of an application table of the GW.

FIG. 4 is a schematic diagram illustrating an example of the application table 23b of the GW 2. The application table 23b according to the present embodiment stores, associated together, the OS ID, which is the identification information for identifying the OS, the application information relating to the application program, and the required function information indicating the OS functions required for executing the application program. The application information includes the application ID, which is identification information for identifying the application program, the data amount of the application program, and whether or not the application program can be stopped when restarting the OS. The required function information includes the type of kernel of the OS required to execute the application program, which of drivers A to C are required, which of libraries A and B are required, and the data amount of the required function. In the present example, as illustrated in the example configuration of the application Table 23b in FIG. 3, the GW 2 runs two OSs, the OS 1 and the OS 2, the applications 1 to 3 are run on the OS 1, and the application 4 is run on the OS 2.

In the illustrated application table 23b, the application 1 run on the OS 1 during normal operations has program data amount of 5 megabytes (MB) and is set to no (prohibited) for stopping the running when the OS 1 is restarted. Also, the application 1 can run on the kernel of the OS 1 or the OS 2, the drivers A and C and the library B are required, and the data amount of the program relating to the required function is 30 MB.

In a similar manner, the application 2 run on the OS 1 during normal operations has program data amount of 3 MB and is set to no for stopping the running when the OS 1 is restarted. Also, the application 2 can only run on the kernel of the OS 1, the driver B and the libraries A and B are required, and the data amount of the program relating to the required function is 20 MB.

The application 3 run on the OS 1 during normal operations has program data amount of 10 MB and is set to yes (allowed) for stopping the running when the OS 1 is restarted. Also, the application 3 can only run on the kernel of the OS 1, the drivers A, B, and C and the libraries A and B are required, and the data amount of the program relating to the required function is 50 MB.

The application 4 run on the OS 2 during normal operations has program data amount of 5 MB and is set to yes for stopping the running when the OS 2 is restarted. Also, the application 4 can run on the kernel of the OS 1 or the OS 2, the drivers A and C and the library B are required, and the data amount of the program relating to the required function is 30 MB.

Figure 5:
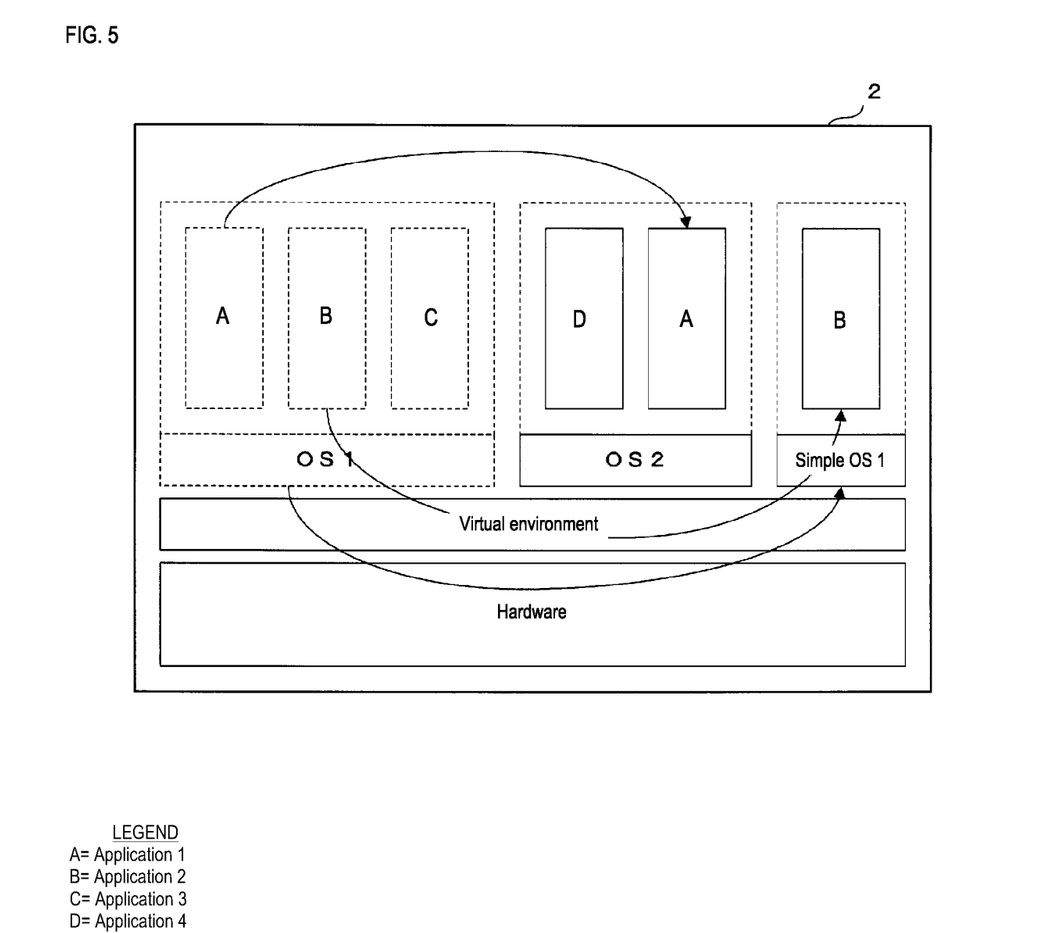
FIG. 5 is a schematic diagram for describing the software configuration in a case in which the GW according to the present embodiment restarts an OS.

FIG. 5 is a schematic diagram for describing the software configuration in a case in which the GW 2 according to the present embodiment restarts the OS 1. For example, in a case in which updating the OS 1 is complete and the OS 1 needs to be restarted, the GW 2 references the application table 23*b* stored in the secondary storage unit 23 and determines which of the application programs of the applications 1 to 3 running on the OS 1 is set to 'cannot be stopped', i.e., determines which application program should be continuously run. In the present example, the application 1 and the application 2 running on the OS 1 are set to 'cannot be stopped'.

From among the application programs that cannot be stopped, in the present example, the application 1 can be run on the OS 2. The GW 2 acquires the free capacity of the storage area of the OS 2 and determines whether or not the 5 MB which is the data amount required for running the application 1 can be secured in the storage area of the OS 2. In a case in which the free capacity of the storage area of the OS 2 is 5 MB or greater, the GW 2 copies the application 1 stored in the storage area of the OS 1 to the storage area of the OS 2. At this time, the GW 2 copies not just the program code of the application 1 but also copies the data (for example, values stored as variables) used by the application 1 in the process at this time. Thereafter, the GW 2 switches from running the application 1 on the OS 1 to running the application 1 on the OS 2.

From among the application programs that cannot be stopped, in the present example, the application 2 can only be run on the OS 1. The GW 2 determines the OS functions required to run the application 2 by referencing the application table 23*b*. In the present example, the kernel of the OS 1, driver B, and libraries A and B are required. The GW 2 acquires the free capacity of the primary storage unit 22 and determines whether or not the 3 MB which is the data amount of the application 2 and the 20 MB which is the data amount relating to the function required for running the application 2 can be secured in the free storage of the primary storage unit 22. In a case in which the free capacity of the primary storage unit 22 is 23 MB or greater, first, the GW 2 creates a simple OS 1 by extracting the required functions (in the present example, the kernel of the OS 1, the driver B, and the libraries A and B) from the OS 1 and starts up and runs the simple OS 1 on the virtual environment. Note that the simple OS 1 may be exactly the same as the OS 1. Next, the GW 2 copies the application 2 stored in the storage area of the OS 1 to the storage area of the simple OS 1 and switches from running the application 2 on the OS 1 to running the application 2 on the simple OS 1.

In a case in which there is not enough free capacity in the storage area of the OS 2 to store the application 1 or there is not enough free capacity in the primary storage unit 22 to store the simple OS 1 and the application 2, the GW 2 cannot run the applications 1 and 2 while the OS 1 restarts and thus goes on standby without restarting the OS 1. However, the GW 2 may restart the OS 1 if the IG switch 6 of the vehicle 1 is in an off state. If the IG switch 6 of the vehicle 1 is in the on state, in a case in which the IG switch 6 is switched from the on state or the off state, the GW 2 restarts the OS 1. Note that in a case in which the OS 1 is restarted with the IG switch 6 in the off state, the GW 2 may stop running the applications 1 and 2 and restart the OS 1 without continuously running the applications 1 and 2 as described above.

After the restart of the OS 1 is complete, the GW 2 runs the application 1 running on the OS 2 and the application 2 running on the simple OS 1 on the post-restart OS 1. At this time, the GW 2 copies the application 1 from the storage area of the OS 2 to the storage area of the OS 1 and switches from running the application 1 on the OS 2 to running the application 1 on the OS 1. In a similar manner, the GW 2 copies the application 2 from the storage area of the simple OS 1 to the storage area of the OS 1 and switches from running the application 2 on the simple OS 1 to running the application 2 on the OS 1. Also, when the OS 1 is restarted, the GW 2 starts up and runs the application 3 which had stopped running.

Note that after the restart of the OS 1 is complete and the applications 1 and 2 have started running on the OS 1, the GW 2 deletes the application 1 stored in the storage area of the OS 2, the simple OS 1 stored in the primary storage unit 22, and the application 2 stored in the storage area of the simple OS 1. Note that in the present embodiment, deleting information such as the program and data stored in the primary storage unit 22 includes not only initializing all areas where the information was stored to an initial value such as all zero, but also managing the storage area so that other information can be written to the areas where the information was stored.

Flowchart

Figure 6:
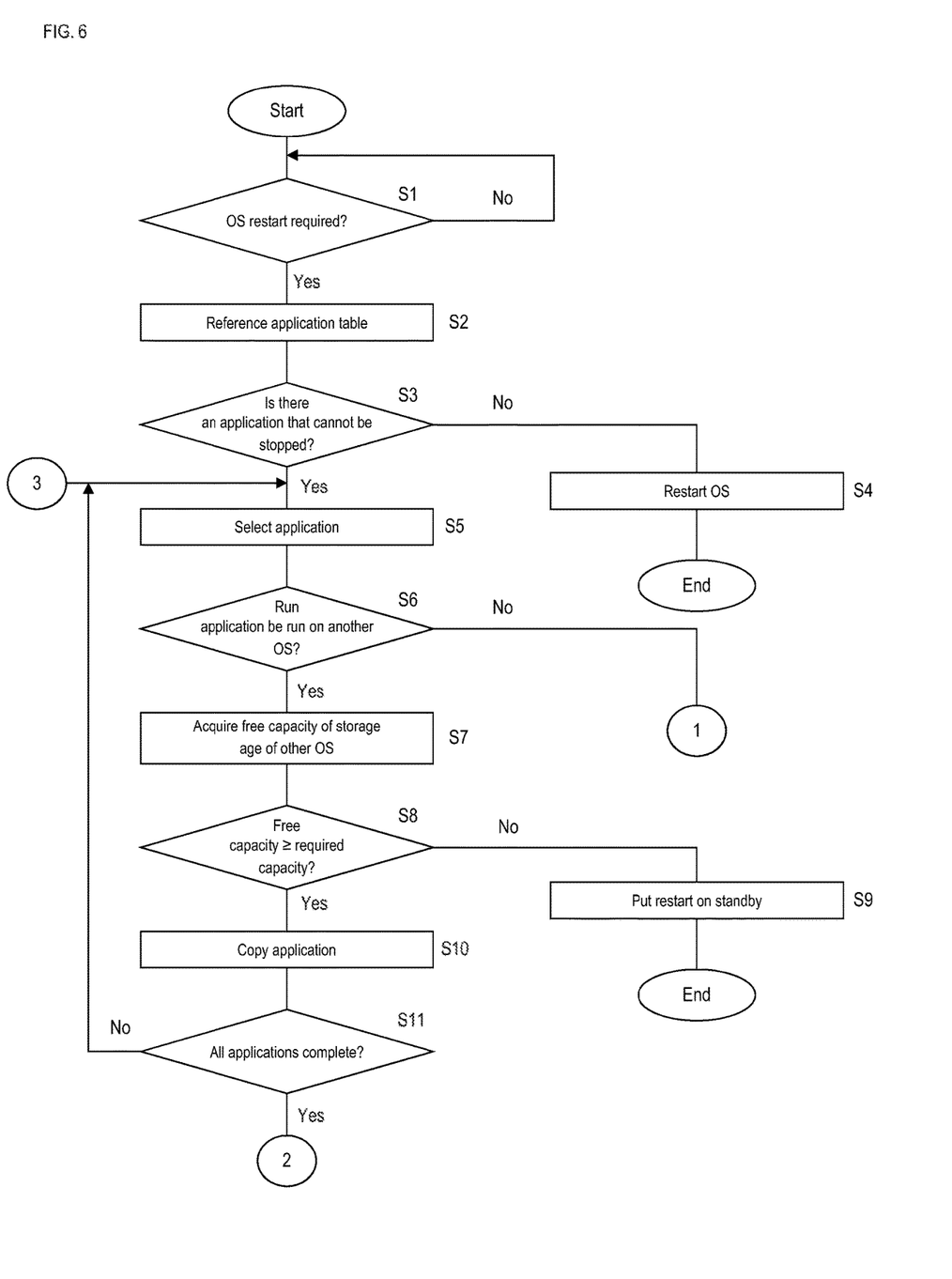
FIG. 6 is a flowchart illustrating the process of OS restart processing executed by the GW according to the present embodiment.
Figure 7:
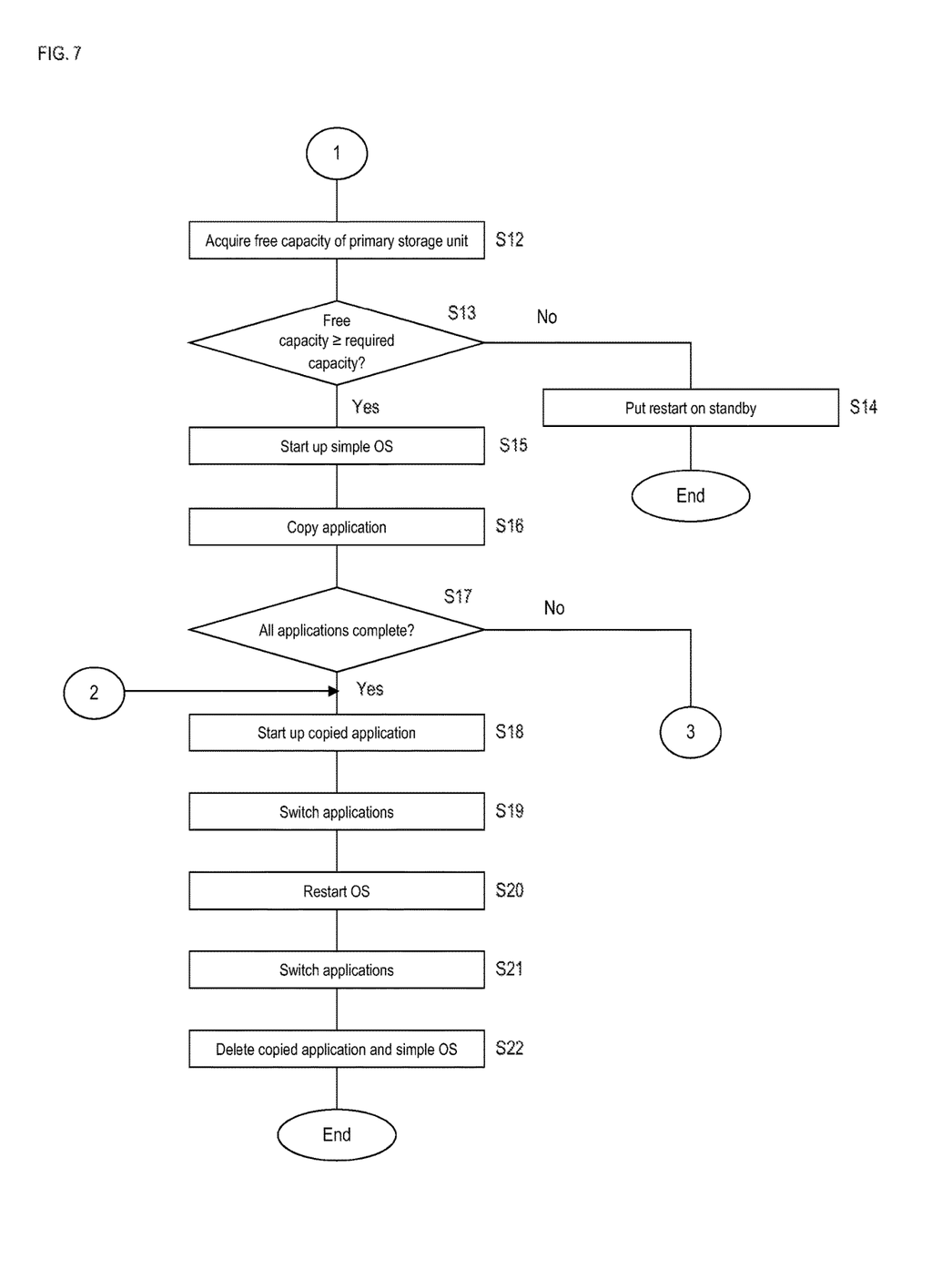
FIG. 7 is a flowchart illustrating the process of OS restart processing executed by the GW according to the present embodiment.

FIGS. 6 and 7 are flowcharts illustrating the process of OS restart processing executed by the GW 2 according to the present embodiment. The restart determination unit 21*a* of the control unit 21 of the GW 2 according to the present embodiment determines whether or not one or a plurality of OSs currently running need to be restarted (step S1). In a case in which it is determined that all of the OSs need to be restarted (no in step S1), the restart determination unit 21*a* is put on standby until an OS needs to be restarted.

In a case in which it is determined that at least one OS needs to be restarted (yes in step S1), the application control unit 21*c* of the control unit 21 references the application table 23*b* (step S2). On the basis of the application table 23*b*, the application control unit 21*c* determines whether or not there is an application program that cannot be stopped during an OS restart among the application programs currently running (step S3). In a case in which there are no application programs that cannot be stopped (no in step S3), the OS control unit 21*b* of the control unit 21 restarts the OS that needs to be restarted (step S4) and ends the processing.

In a case in which there is an application program that cannot be stopped (yes in step S3), the application control unit 21*c* selects one application program for processing from among the one or more application programs that cannot be stopped (step S5). On the basis of the application table 23*b*, the application control unit 21*c* determines whether or not the application program selected in step S5 can run on another OS (step S6). In a case in which the application program can run on another OS (yes in step S6), the application control unit 21c acquires the free capacity of the storage area of the other OS (step S7). The application control unit 21c compares the free capacity acquired in step S7 and the capacity required to run the application program for processing and determines whether or not the free capacity is equal to or greater than the required capacity (step S8). In a case in which the free capacity is less than the required capacity (no in step S8), the control unit 21 puts the OS restart on standby (step S9) and ends the processing.

In a case in which the free capacity is equal to or greater than the required capacity (yes in step S8), the application control unit 21c copies the application program for processing from the storage area of the OS to be restarted to the storage area of the other OS (step S10). The application control unit 21c determines whether or not all of the application programs that cannot be stopped have been copied to the other OS (step S11). In a case in which copying all of the application programs that cannot be stopped is not complete (no in step S11), the application control unit 21c returns the processing to step S5, selects another application program, and executes similar processing. In a case in which copying all of the application programs that cannot be stopped is complete (yes in step S11), the application control unit 21c proceeds to the processing of step S18.

Also, in a case in which the application control unit 21c determines that the application program selected in step S5 cannot be run on another OS (no in step S6), the free capacity of the primary storage unit 22 is acquired (step S12). The application control unit 21c compares the free capacity acquired in step S12 and the capacity required to run the application program for processing and a simple OS for running the application program for processing and determines whether or not the free capacity is equal to or greater than the required capacity (step S13). In a case in which the free capacity is less than the required capacity (no in step S13), the control unit 21 puts the OS restart on standby (step S14) and ends the processing.

In a case in which the free capacity is equal to or greater than the required capacity (yes in step S14), the OS control unit 21b creates and runs the simple OS with the functions required to run the application program extracted from the OS to be restarted (step S15). The application control unit 21c copies the application program for processing from the storage area of the OS to be restarted to the storage area of the simple OS started up in step S15 (step S16). The application control unit 21c determines whether or not all of the application programs that cannot be stopped have been copied to the other OS (simple OS) (step S17). In a case in which copying all of the application programs that cannot be stopped is not complete (no in step S17), the application control unit 21c returns the processing to step S5, selects another application program, and executes similar processing. In a case in which copying all of the application programs that cannot be stopped is complete (yes in step S17), the application control unit 21c proceeds to the processing of step S18.

The application control unit 21c starts up the application program copied in steps S10 and S16 (step S18). The application control unit 21c switches from the application program running on the OS to be restarted to the application program started up in step S18 (step S19). The OS control unit 21b restarts the OS that needs to be restarted (step S20). After the OS has completed restarting, the application program temporarily made to run on the other OS or the simple OS is copied to the storage area of the OS after restart completion and started up, and a switch is performed from the application program running on the other OS or the simple OS to the application program of the restarted OS (step S21). The application control unit 21c deletes the application program temporarily copied to the storage area of the other OS or the simple OS (step S22), and the processing ends.

Figure 8:
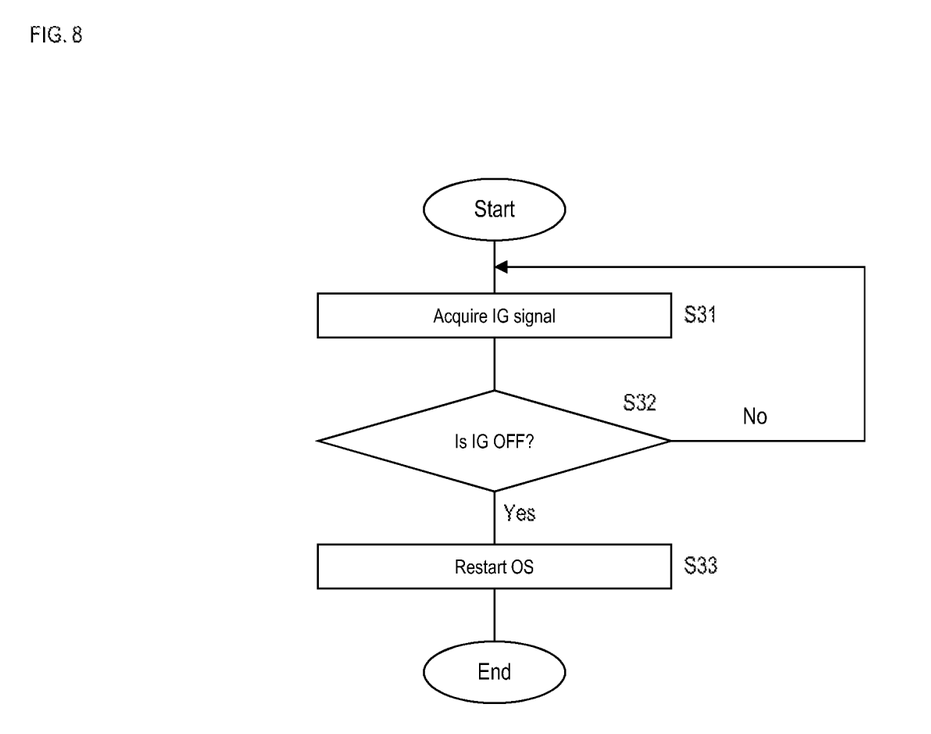
FIG. 8 is a flowchart illustrating the process of standby processing executed by the GW according to the present embodiment.

FIG. 8 is a flowchart illustrating the process of the standby processing executed by the GW 2 according to the present embodiment. The control unit 21 of the GW 2 according to the present embodiment starts the processing of the flowchart illustrated in FIG. 8 in a case in which the OS restart is put into standby in step S9 or step S14 of the flowchart illustrated in FIG. 7. The control unit 21 acquires the IG signal received from the IG switch 6 of the vehicle 1 (step S31). The control unit 21 determines whether or not the IG switch 6 is in the off state on the basis of the acquired IG signal (step S32). In a case in which the IG switch 6 is in the on state (no in step S32), the control unit 21 returns to the processing of step S31 and the OS restart is put on standby until the IG switch 6 switches from the on state to the off state. In a case in which the IG switch 6 is in the off state (yes in step S32), the OS control unit 21b of the control unit 21 restarts the OS in standby (step S33) and the processing ends.

SUMMARY

The GW 2 according to the present embodiment with the configuration described above controls a plurality of OSs running on a common piece of hardware. The GW 2 determines whether or not the plurality of OSs need to be restarted and, in a case in which one of the OSs needs to be restarted, runs the application program running on the one OS on another OS. Thereafter, the GW 2 restarts the one OS and, when restart is complete, runs the application program that was run on the other OS on the one OS. In this manner, the GW 2 is capable of executing the application program running on one OS on another OS and continuously executing the processing of the application program even while the one OS is restarting.

Also, the GW 2 according to the present embodiment runs the other OS in parallel while the one OS is being restarted. In this manner, the GW 2 is capable of executing in parallel the application program on the other OS while the one OS is restarting.

Also, the GW 2 according to the present embodiment, in a case in which the application program that runs on the one OS is run on the other OS, copies the application program stored in the storage area used by the one OS to the storage area used by the other OS. After the one OS has completed restarting, the copied application program is deleted from the storage area of the other OS by the GW 2. In this manner, the GW 2 is capable of copying the application program from the storage area of the one OS and run the application program on the other OS. Thus, an application program that can run on the other OS does not need to be prepared.

Also, the GW 2 according to the present embodiment determines, from one or more application programs running on the one OS determined to need to be restarted, which application program should be continuously run while the one OS is restarted. The GW 2 determines whether or not the other OS is capable of running the application program that should be continuously run. The GW 2 determines whether or not there is enough free capacity to store the application program in the storage area of the other OS determined to be capable of running the application program. In a case in which it is determined that there is enough free capacity, the GW 2 copies the application program to the storage area of the other OS and runs the application program. According to this processing, it is expected that the GW 2 is able to more reliably run the application program that should be continuously run while the OS is restarting.

Also, the GW 2 according to the present embodiment, in a case in which there is not enough free capacity to store the application program in the storage area of the other OS, puts the restart of the one OS running the application program on standby without restarting the one OS. This prevents an application program that should be continuously run from being stopped.

Also, in a case in which the OS restart is put on standby, the GW 2 executes the OS restart after the IG switch 6 of the vehicle 1 is switched from the on state to the off state. In this manner, the GW 2 can restart the OS at a stage where there is a high likelihood that the user has finished using the vehicle 1, in other words, at a stage where there is a high likelihood that no problems will occur if the processing of the application program is stopped.

Also, in a case in which it is determined that there is no other OS capable of running the application program that should be continuously run, the GW 2 according to the present embodiment starts up an alternative OS (simple OS) that functions as an alternative to the OS to be restarted and runs the application program on the alternative OS. Accordingly, the GW 2 is able to more reliably run the application program that should be continuously run.

Also, the GW 2 according to the present embodiment uses the simple OS including a portion of the functions of the OS to be restarted as the alternative OS. In this manner, compared to the case of an alternative OS with all of the functions of the OS, the use amount of the storage area of the GW 2 can be reduced.

Also, the GW 2 according to the present embodiment can provide a virtual environment obtained by virtualizing the hardware to the OS and run a plurality of OSs on the virtual environment. Accordingly, the versatility of the OSs run by the GW 2 can be improved and development can be simplified.

Note that in the present embodiment, a configured is used in which separate storage areas are allocated to the plurality of OSs, but no such limitation is intended. For example, in another configuration, a plurality of OSs may share a common single storage area, and in this case, instead of copying the application program, the application program can be run on another OS. Also, in the present embodiment, the software to be restarted is an OS, but no such limitation is intended. For example, an interpreter, virtual machine (VM), or other similar software may be used, or a basic software that provides an execution environment for various application programs may be used.

Modified Example

Figure 9:
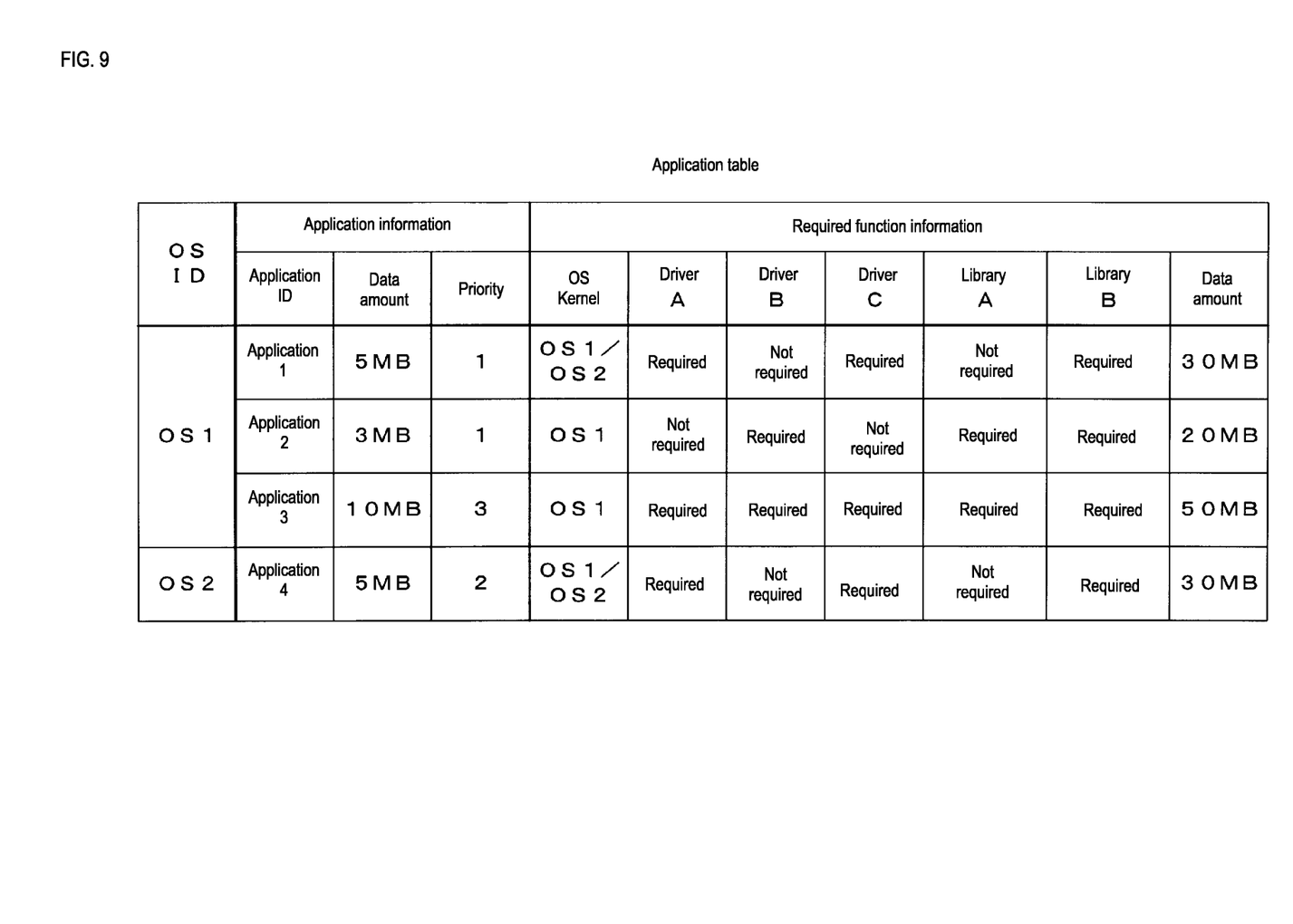
FIG. 9 is a schematic diagram illustrating an example of an application table of a GW according to a modified example.

FIG. 9 is a schematic diagram illustrating an example of the application table 23b of the GW 2 according to the modified example. In the application table 23b according to the modified example illustrated in FIG. 9, for the information set for the application programs, 'whether or not the application can be stopped' of the application table 23b illustrated in FIG. 4 is replaced with 'priority'. In the present example, priority is set with three levels, 1 to 3, and a priority of one is the highest priority.

The GW 2 according to the modified example determines the application program with a priority of one as an application program that cannot be stopped running when the OS is restarted and run the application program on another OS. In a case in which the application program with a priority of one cannot be run on another OS, the GW 2 puts the OS restart on standby. In other words, an application program with a priority of one is treated in a similar manner as an application program set with 'cannot be stopped' in the application table 23b illustrated in FIG. 4.

The GW 2 according to the modified example determines the application program with a priority of two as an application program that, if possible, is continuously run when the OS is restarted. First, after the preparation, such as copying, for executing the application program with a priority of one is complete, the GW 2 determines whether or not the application program with a priority of two can be run on another OS. In a case in which there is enough space in the storage area of the other OS and in a case in which the application program with a priority of two can be run on the other OS, the GW 2 copies the application program with a priority of two to the storage area of the other OS and runs the application program. Even in a case in which the application program with a priority of two cannot be run on another OS, the GW 2 restarts the OS.

The GW 2 according to the modified example determines the application program with a priority of three as an application program that is not required to be continuously run when the OS is restarted. In other words, an application program with a priority of three is treated in a similar manner as an application program set with 'can be stopped' in the application table 23b illustrated in FIG. 4. However, if an application program with a priority of three is able to be run on another OS, the GW 2 may continuously run the application program while the OS is restarted.

The GW 2 according to the modified example with the configuration described above determines which application program should be continuously run while the OS is restarted according to the priority set to the application program. In this manner, the GW 2 is capable of prioritizing the running of application programs with a high priority on another OS, for example.

The apparatuses of the in-vehicle information processing system are provided with a computer that includes a microprocessor, ROM, RAM, and the like. The arithmetic processing unit of the microprocessor or the like may be executed by reading out a computer program including a portion or all of the steps of the sequence diagram or flowchart such as those illustrated in FIGS. 6 to 8 from a storage unit, such as ROM, RAM, or the like. The computer program of these apparatuses may be installed from an external server device or the like. Also, the computer program of these apparatuses may be distributed while stored in a recording medium, such as a CD-ROM, a DVD-ROM, a semiconductor memory, and the like.

The embodiments disclosed herein are examples in all respects and should not be interpreted as limiting in any manner. The present disclosure is defined not by the foregoing description, but by the scope of the claims, and intended to include all modifications that are equivalent to or within the scope of the claims.

The invention claimed is:

1. An in-vehicle information processing apparatus installed in a vehicle, comprising:
   a control unit that controls a plurality of operating systems (OSs) running on common hardware, wherein
   the control unit
      determines whether or not the plurality of OSs need to be restarted, in a case in which the control unit determines that one OS needs to be restarted, runs an application program running on the one OS on an OS different from the one OS, restarts the one OS, and after restart is complete, runs the application program running on the OS different from the one OS on the one OS; and a storage unit that temporarily stores an OS and application program to be run, wherein the control unit in a case in which an application program running on the one OS is run on the OS different from the one OS, copies the application program stored in one storage area of the storage unit used by the one OS to a storage area of the storage unit used by the OS different from the one OS, and after restart of the one OS is complete, deletes the application program copied to the storage area of the storage unit used by the OS different from the one OS.

2. The in-vehicle information processing apparatus according to claim 1, wherein the control unit runs the OS different from the one OS in parallel while the one OS is being restarted.

3. The in-vehicle information processing apparatus according to claim 1, wherein the control unit in a case in which the control unit determines that the one OS needs to be restarted, determines, from among one or more application programs running on the one OS, an application program that should be continuously run while the one OS is restarted, determines whether or not there is an OS capable of running the application program should be continuously run, determines whether or not there is free capacity to store the application program that should be continuously run in a storage area used by the OS determined to be able to run the application program that should be continuously run, and in a case in which the control unit determines that there is free capacity, copies the application program to the other storage area used by the OS determined to be able to run the application program that should be continuously run.

4. The in-vehicle information processing apparatus according to claim 3, wherein in a case in which the control unit determines that the free capacity does not exist, the control unit puts restarting the one OS on standby.

5. The in-vehicle information processing apparatus according to claim 4, wherein after an ignition switch of the vehicle is switched from an on state to an off state, the control unit restarts the one OS on standby.

6. The in-vehicle information processing apparatus according to claim 1, wherein the control unit in a case in which the control unit determines that the OS different from the one OS does not exist, starts up an alternative OS that functions as an alternative to the one OS, and runs the application program on the alternative OS.

7. The in-vehicle information processing apparatus according to claim 6, wherein the alternative OS is an OS including a portion of a plurality of functions the one OS is provided with.

8. The in-vehicle information processing apparatus according to claim 1, wherein each application program is set with a priority; and the control unit determines an application program that should be continuously run while the one OS is restarted according to the priority.

9. The in-vehicle information processing apparatus according to claim 1, wherein the control unit runs the plurality of OSs in a virtual environment obtained by virtualizing the hardware.

10. A control method for an in-vehicle information processing apparatus installed in a vehicle that controls a plurality of OSs running on common hardware, comprising:

via a control unit of the in-vehicle information processing apparatus, determining whether or not the plurality of OSs need to be restarted;

in a case in which the control unit determines that one OS needs to be restarted, running an application program running on the one OS on an OS different from the one OS;

restarting the one OS;

after restart is complete, running the application program running on the OS different from the one OS on the one OS;

temporarily storing an OS and application program to be run on a storage unit;

in a case in which an application program running on the one OS is run on the OS different from the one OS, copying the application program stored in one storage area of the storage unit used by the one OS to a storage area of the storage unit used by the OS different from the one OS, and deleting the application program copied to the storage area of the storage unit used by the OS different from the one OS after restarting of the one OS is complete.

11. A computer program product installed in a vehicle, the computer program product comprising a non-transitory, machine-readable medium storing instructions which, when executed by at least one programmable processor, causes the at least one programmable processor to control a plurality of operating systems (OSs) running on common hardware, the computer program product further performing the operations comprising:

determining whether or not the plurality of OSs need to be restarted;

in a case in which it is determined that one OS needs to be restarted, running an application program running on the one OS on an OS different from the one OS, restarting the one OS;

after restart is complete, running the application program running on the OS different from the one OS;

temporarily storing an OS and application program to be run on a storage unit;

in a case in which an application program running on the one OS is run on the OS different from the one OS, copying the application program stored in one storage area of the storage unit used by the one OS to a storage area of the storage unit used by the OS different from the one OS, and deleting the application program copied to the storage area of the storage unit used by the OS different from the one OS after restarting of the one OS is complete.

* * * * *